(12) United States Patent
Sekine

(10) Patent No.: US 12,096,370 B2
(45) Date of Patent: Sep. 17, 2024

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Hiroshi Sekine, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/503,059

(22) Filed: Oct. 15, 2021

(65) Prior Publication Data

US 2022/0039020 A1 Feb. 3, 2022

Related U.S. Application Data

(63) Continuation of application No. 16/511,417, filed on Jul. 15, 2019, now Pat. No. 11,985,602, which is a (Continued)

(30) Foreign Application Priority Data

Mar. 11, 2014 (JP) ................. 2014-048095

(51) Int. Cl.
*H04W 52/02* (2009.01)
*H04M 1/72412* (2021.01)
*H04W 4/80* (2018.01)
(52) U.S. Cl.
CPC ... *H04W 52/0274* (2013.01); *H04M 1/72412* (2021.01); *H04W 4/80* (2018.02);
(Continued)

(58) Field of Classification Search
CPC ............ H04W 52/0274; H04W 4/80; H04W 52/0258; H04W 88/06; H04M 1/72412;
(Continued)

(56) References Cited

U.S. PATENT DOCUMENTS 9,025,579 B2\* 5/2015 Kwon .................. H04B 5/0031
370/338
2005/0186906 A1 8/2005 Hussmann
(Continued)

FOREIGN PATENT DOCUMENTS

EP 2525554 A2 11/2012
EP 2645812 A2 10/2013
(Continued)

OTHER PUBLICATIONS

Samsung Printer Xpress C41x series User's Guide, Quick Guide for Windows 8 User, 2013.
(Continued)

*Primary Examiner* — Ivan O Latorre
(74) *Attorney, Agent, or Firm* — Canon U.S.A., Inc. IP Division

(57) ABSTRACT

When a handover is performed, Wi-Fi setting is automatically changed from an inactive state to an active state. In a case where no user operation is performed within a prescribed time period, the Wi-Fi setting is returned from the active state to the inactive state.

19 Claims, 9 Drawing Sheets

Related U.S. Application Data continuation of application No. 14/642,545, filed on Mar. 9, 2015, now Pat. No. 10,383,061.

(52) U.S. Cl.
CPC .... *H04M 2250/04* (2013.01); *H04M 2250/06* (2013.01); *Y02D 30/70* (2020.08)

(58) Field of Classification Search
CPC .......... H04M 2250/04; H04M 2250/06; Y02D 30/70; G06F 3/1292; G06F 3/00
See application file for complete search history.

(56) References Cited

U.S. PATENT DOCUMENTS

| | | | | |
|---|---|---|---|---|
| 2006/0120313 | A1* | 6/2006 | Moritomo | H04W 52/0235 370/311 |
| 2007/0224980 | A1* | 9/2007 | Wakefield | G08B 21/0291 455/418 |
| 2009/0036056 | A1 | 2/2009 | Oshima | |
| 2010/0177673 | A1* | 7/2010 | Yoon, II | H04W 52/0209 370/311 |
| 2011/0176417 | A1* | 7/2011 | Kuwabara | H04W 36/22 370/230 |
| 2012/0208461 | A1 | 8/2012 | Choi | |
| 2013/0035138 | A1* | 2/2013 | Abbott | H04M 1/72412 455/566 |
| 2013/0231051 | A1 | 9/2013 | Naruse | |
| 2013/0260683 | A1* | 10/2013 | Suzuki | G06F 3/1204 455/41.1 |
| 2014/0063537 | A1 | 3/2014 | Nishikawa | |
| 2014/0085675 | A1* | 3/2014 | Watanabe | H04N 1/32635 358/1.15 |
| 2014/0094117 | A1* | 4/2014 | Rajendran | H04W 12/35 455/41.1 |
| 2014/0192692 | A1* | 7/2014 | Stark | H04B 1/406 370/311 |
| 2014/0355048 | A1* | 12/2014 | Kang | G06F 3/1292 358/1.15 |
| 2015/0038087 | A1* | 2/2015 | Park | H04W 76/14 455/41.3 |

FOREIGN PATENT DOCUMENTS

| | | |
|---|---|---|
| JP | 2012-113349 A | 6/2012 |
| JP | 2013-214806 A | 10/2013 |
| JP | 2013-214959 A | 10/2013 |
| JP | 2014027538 A | 2/2014 |

OTHER PUBLICATIONS

Samsung; "User's Guide Samsung Printer Xpress C41x series"; Jan. 1, 2013; XP055891990; Retrieved from the Internet: URL:http://h10032.www1.hp.com/ctg/Manual/c05787832.pdf (retrieved on Feb. 15, 2022); pp. 1-238.

"Connection Handover Technical Specification NFC Forum", XP055118241, Jul. 7, 2010, Retrieve from the Internet. URL: http://www.cardsys.dk/download/NFC_Docs/NFC Connection Handover 1.2 Technical Specification.pdf (retrieved on May 15, 2014).

* cited by examiner

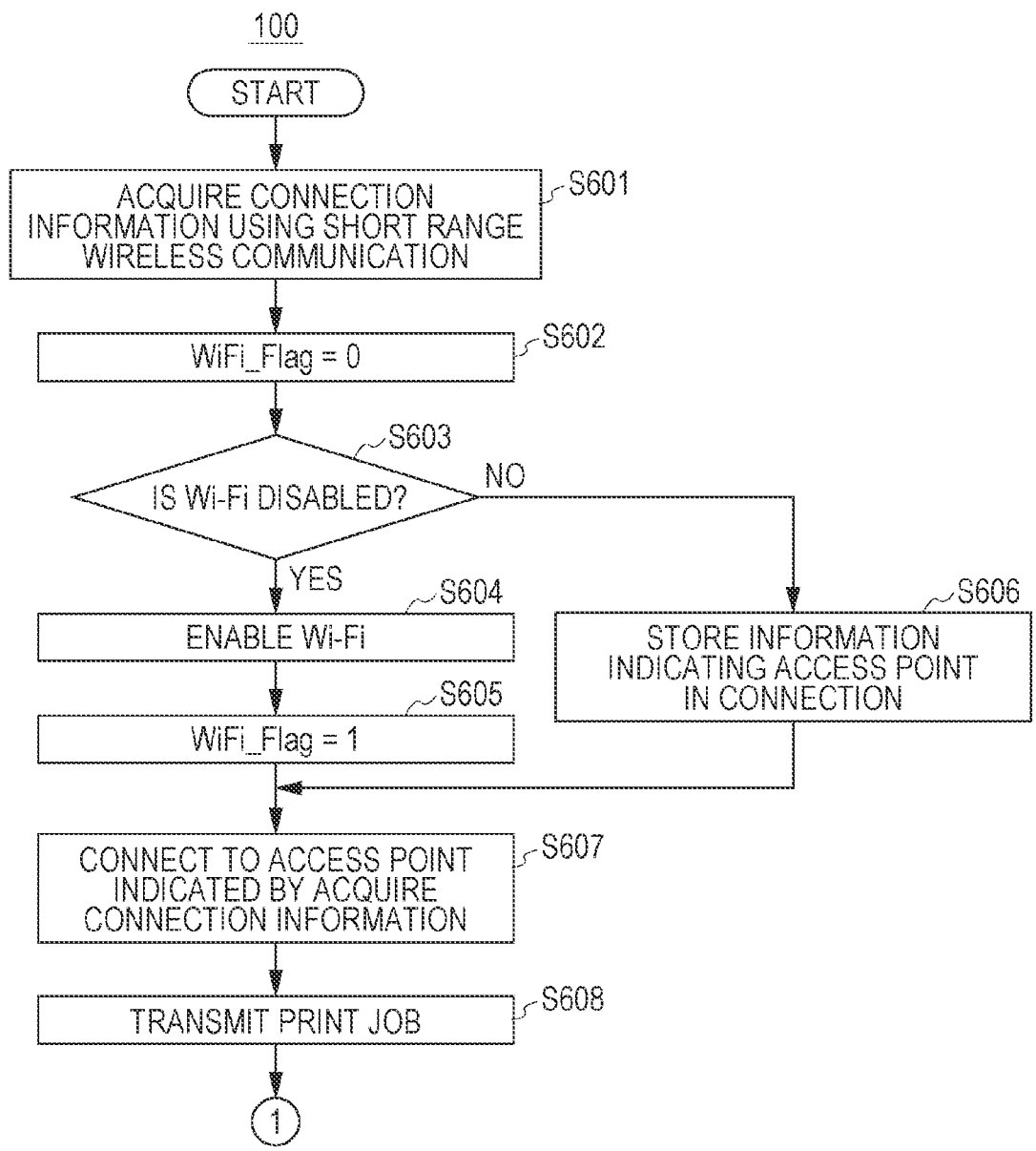

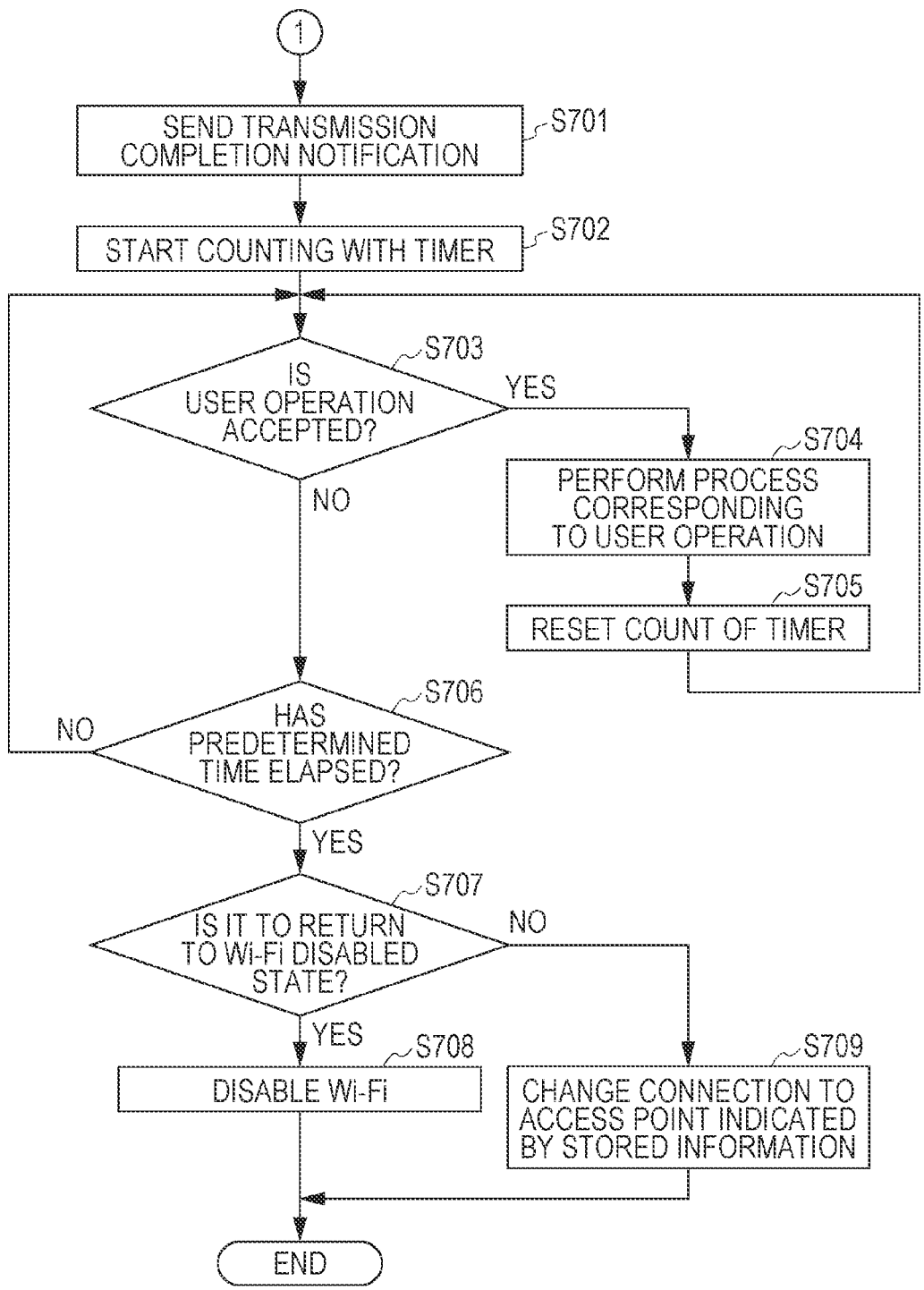

INFORMATION PROCESSING APPARATUS, METHOD OF CONTROLLING INFORMATION PROCESSING APPARATUS, AND STORAGE MEDIUM

CROSS REFERENCE TO RELATED APPLICATIONS

The present application is a continuation of U.S. patent application Ser. No. 16/511,417, filed on Jul. 15, 2019, which is a continuation of U.S. patent application Ser. No. 14/642,545, filed on Mar. 9, 2015 and issued as U.S. Pat. No. 10,383,061 on Aug. 13, 2019, which claims priority from Japanese Patent Application No. 2014-048095 filed Mar. 11, 2014, which are hereby incorporated by reference herein in their entireties.

BACKGROUND OF THE INVENTION

Field of the Invention

The present invention relates to an information processing apparatus capable of performing wireless communication.

Description of the Related Art

A portable terminal such as a smartphone, a tablet personal computer (PC) has a wireless communication function. The wireless communication function may be used, for example, to transmit a picture or an electronic document stored in the portable terminal to a printer using wireless communication to print the transmitted picture or electronic document using the printer.

In order for the portable terminal to perform wireless communication with an external apparatus such as a printer or the like, the portable terminal may connect to an access point and establish a wireless communication. As a method of establishing the wireless communication, Japanese Patent Laid-Open No. 2013-157736 discloses a handover procedure using near field communication (NFC). In the handover procedure, connection information necessary to perform wireless communication is acquired using short range communication such as NFC or the like, and wireless communication is established based on the acquired connection information. The handover makes it possible for user to easily establish wireless communication between a portable terminal and an external apparatus such as a printer simply by bringing the portable terminal to a position close to the external apparatus (or by bring the portable terminal into touch with the external apparatus).

A portable terminal such as a smartphone, a tablet personal computer (PC) has a Wi-Fi (Wireless Fidelity) setup capability such that wireless communication using Wi-Fi is set to be enabled or disabled. To enable the wireless communication, a user sets the Wi-Fi to an active state (ON setting). When wireless communication is not performed, for example, in a situation in which a user goes out, a user may set the Wi-F to an inactive state (OFF setting), which allows it to reduce electric power consumption.

Note that in the portable terminal, the Wi-Fi is not always in the active state, but there is a possibility that Wi-Fi is set in the inactive state. When the Wi-Fi is in the inactive state, even if a user brings the portable terminal to a position close to an external apparatus such as a printing apparatus to perform a handover, wireless communication between the portable terminal and the external apparatus is not established because the Wi-Fi is disabled. Even if the user notices that the Wi-Fi is in the inactive state, the user needs to perform a troublesome manual operation to change the Wi-Fi to the active state.

SUMMARY OF THE INVENTION

The present invention provides a technique of making it easier for a user to change the setup associated with wireless communication.

According to an aspect of the present disclosure, there is provided an information processing apparatus capable of performing wireless communication and capable of selectively setting the wireless communication to an ON setting in which wireless communication is enabled or an OFF setting in which wireless communication is disabled, including an acquisition unit configured to acquire connection information associated with the wireless communication, a wireless communication unit configured to perform data communication using the wireless communication based on the connection information acquired by the acquisition unit, and a change unit configured to change the setting of the wireless communication, wherein in a case where the setting associated with wireless communication is set in the OFF setting, the change unit changes the setting associated with wireless communication from the OFF setting to the ON setting, and wherein in a case where the setting associated with wireless communication is changed by the change unit from the OFF setting to the ON setting, then in response to a prescribed condition being satisfied after completion of the data communication, the change unit returns the setting associated with wireless communication from the ON setting to the OFF setting.

Further features of the present invention will become apparent from the following description of exemplary embodiments with reference to the attached drawings.

BRIEF DESCRIPTION OF THE DRAWINGS

FIG. 6 is a flow chart illustrating a process of automatically changing Wi-Fi setting.

FIG. 7 is a flow chart illustrating a process of automatically returning the Wi-Fi setting to an original state.

DESCRIPTION OF THE EMBODIMENTS

Embodiments of the present disclosure are described below with reference to drawings. Note that the purpose of the embodiments described below is not to limit the invention. Also note that all parts, elements, or steps described in embodiments are not necessarily needed to practice the invention.

First Embodiment

Figure 1:
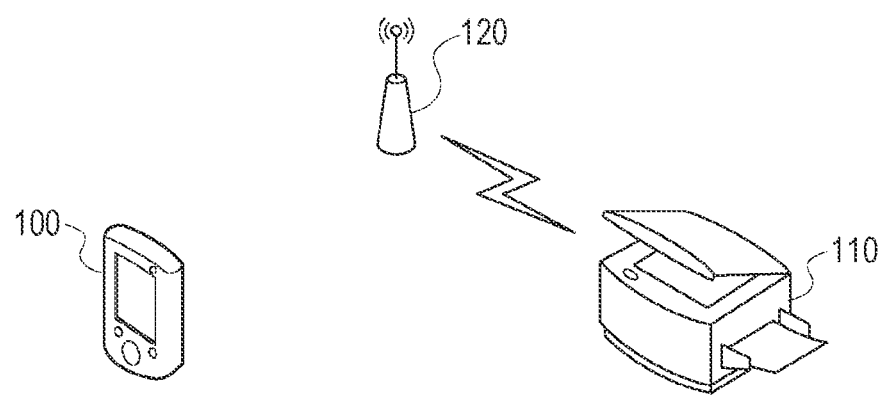
FIG. 1 is a diagram illustrating a configuration of a communication system.

First, referring to FIG. 1, a configuration of a communication system according to a first embodiment is described below. The communication system according to the present embodiment includes a portable terminal 100, a printing apparatus 110, and an access point 120.

The printing apparatus 110 performs wireless communication with the access point 120 using Wi-Fi or the like. Note that the communication between the access point 120 and the printing apparatus 110 may be realized by wired communication using a LAN cable or the like.

The portable terminal 100 is capable of performing wireless communication such as Wi-Fi wireless communication. When a user enters an SSID or a security key associated with the access point 120 into the portable terminal 100, the portable terminal 100 is connected to the access point 120 and it becomes possible for the portable terminal 100 to communicate with the printing apparatus 110 via the access point 120. Thus, the portable terminal 100 is allowed to transmit a print job to an external apparatus such as the printing apparatus 110 via the access point 120. When the printing apparatus 110 receives the print job, the printing apparatus 110 performs printing.

The portable terminal 100 and the printing apparatus 110 are capable of performing short range communication such as NFC. In the present embodiment, the printing apparatus 110 includes an NFC tag in which information (such as the SSID or the security key of the access point 120) used to connect to the access point 120 is stored. The portable terminal 100 may acquire information associated with the NFC tag of the printing apparatus 110 using the NFC and may connect to the access point 120 based on the acquired information. Switching the connection to wireless communication such as Wi-Fi wireless connection using the information acquired via the short range communication such as NFC is called handover. The handover makes it unnecessary for a user to enter the information (the SSID or the security key of the access point 120) into the portable terminal 100 to make a connection to the access point 120.

Figure 2:
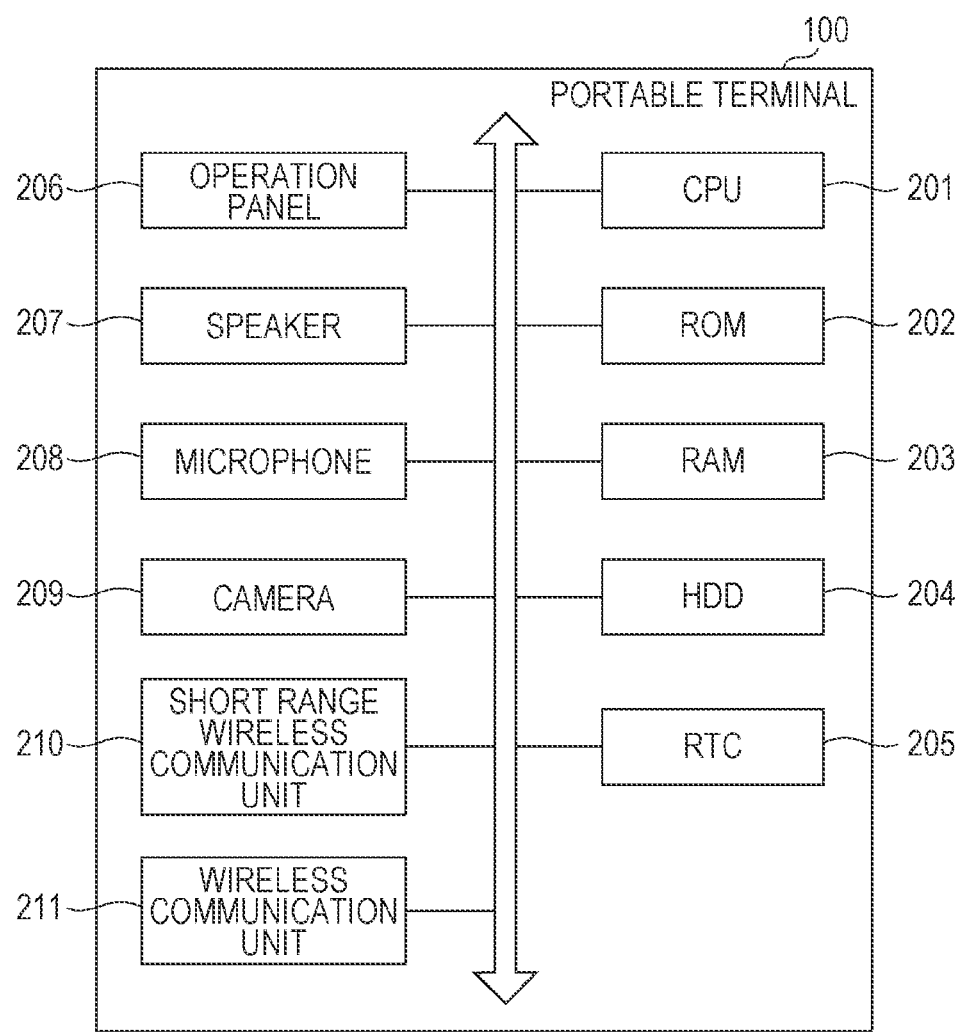
FIG. 2 is diagram illustrating a hardware configuration of a portable terminal 100.

Next, referring to FIG. 2, a hardware configuration of the portable terminal 100 is described below. Note that although it is assumed in the following description by way of example but not limitation that the portable terminal 100 is a smartphone, a tablet PC, or a similar apparatus, the portable terminal 100 may be another type of information processing apparatus capable of performing wireless communication.

The CPU 201 reads out a control program stored in a ROM 202 and performs various kinds of processes to control operations of the portable terminal 100. The ROM 202 stores the control program as described above. A RAM 203 provides a temporary storage area such as a main memory, a work area, and the like used by the CPU 201. An HDD 204 stores various kinds of data such as pictures, electronic documents, and the like. The HDD 204 also stores an operating system (OS) 310 and a print application 300, which will be described later. A real time clock (RTC) 205 measures a time. Note that a flash memory may be provided instead of the HDD 204.

Note that it is assumed by way of example but not limitation that in the portable terminal 100, one CPU 201 performs various processes described below with reference to flow charts. Alternatively, for example, a plurality of CPUs may perform, in cooperation, various processes described below with reference to flow charts.

An operation panel 206 has a touch panel function capable of detecting a touch operation performed by a user, and displays various screens provided by the OS 310 or the print application 300. A user is allowed to input an operation instruction to the portable terminal 100 by performing a touch operation on the operation panel 206. The portable terminal 100 has a not-illustrated hardware key such that a user is allowed to use this hardware key to input an operation instruction to the portable terminal 100.

A speaker 207 and a microphone 208 are used when a user makes a telephone communication with another portable terminal or a fixed-line telephone terminal. The camera 209 takes a picture in accordance with a command issued by a user. The picture taken by the camera 209 is stored in a particular storage area of the HDD 204.

A short range communication unit 210 performs short range communication such as NFC or the like. In the present embodiment, the printing apparatus 110 includes an NFC tag. When a user brings the portable terminal 100 to a position close to the NFC tag of the printing apparatus 110, short range communication is established between the short range communication unit 210 and the NFC tag of the printing apparatus 110 and the short range communication unit 210 acquires information associated with the NFC tag. Note that the short range communication performed by the short range communication unit 210 is not limited to the NFC but another short range communication technique, for example, Bluetooth (registered trademark) may be employed.

The wireless communication unit 211 performs wireless communication such as Wi-Fi wireless communication. In the portable terminal 100, use of the handover allows a user to achieve wireless communication using the wireless communication unit 211 by performing a simple operation. More specifically, the short range communication unit 210 may acquire connection information (such as the SSID or the security key of the access point 120) from the NFC tag of the printing apparatus 110, and the wireless communication unit 211 may connect to the access point 120 using the acquired connection information.

Figure 3:
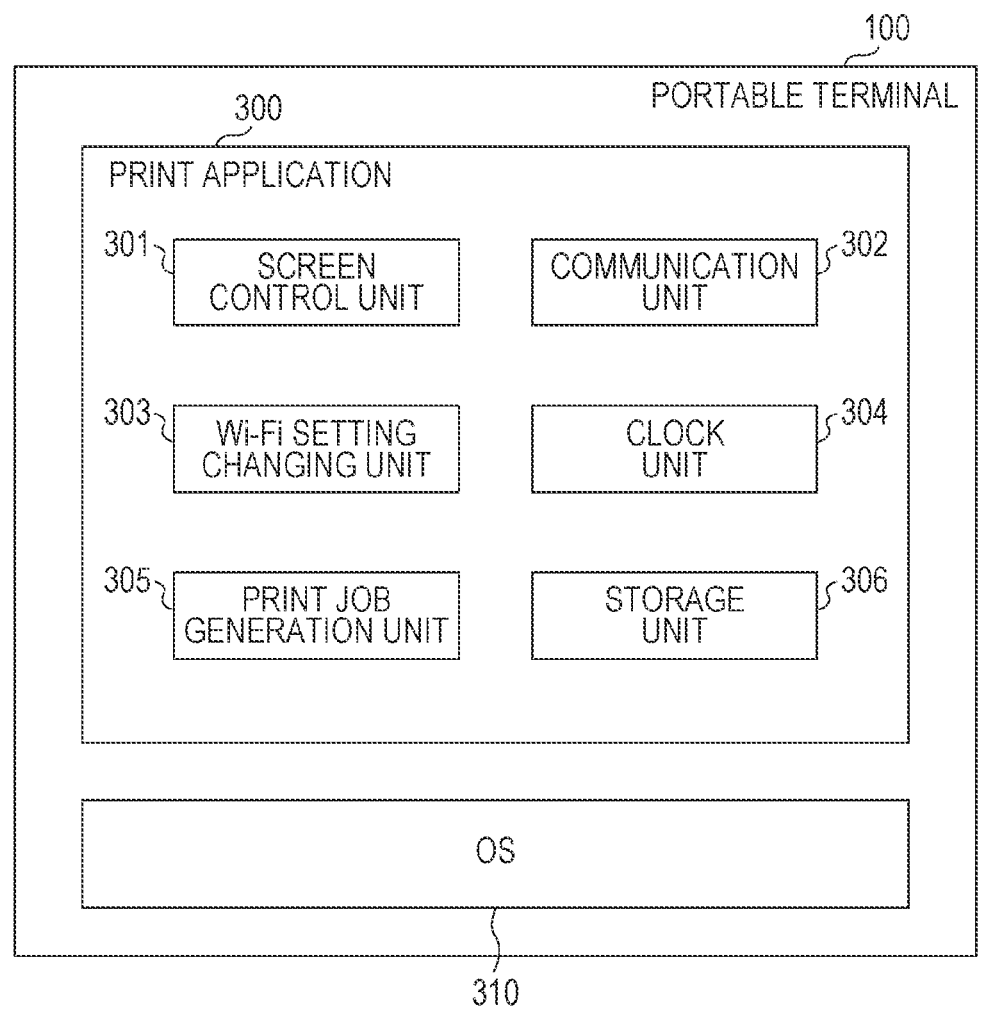
FIG. 3 is a diagram illustrating a software configuration of the portable terminal 100.

Next, referring to FIG. 3, a software configuration of the portable terminal 100 is described below. FIG. 3 is a diagram illustrating software functional blocks realized by the CPU 201 by reading out a control program stored in the ROM 202 or the HDD 204.

An OS 310 is software for generally controlling an operation of the portable terminal 100. In the portable terminal 100, it may be allowed to install various applications including the print application 300 described below. The OS 310 transmits and receives information to or from these applications. In accordance with an instruction received from an application, the OS 310 performs a process such as displaying or changing a screen on the operation panel 206, performing wireless communication using the wireless communication unit 211, or the like.

The print application 300 is an application installed in the portable terminal 100. In addition to the print application 300, other various applications may be installed in the portable terminal 100, although a further detailed description thereof is omitted.

Figure 5A:
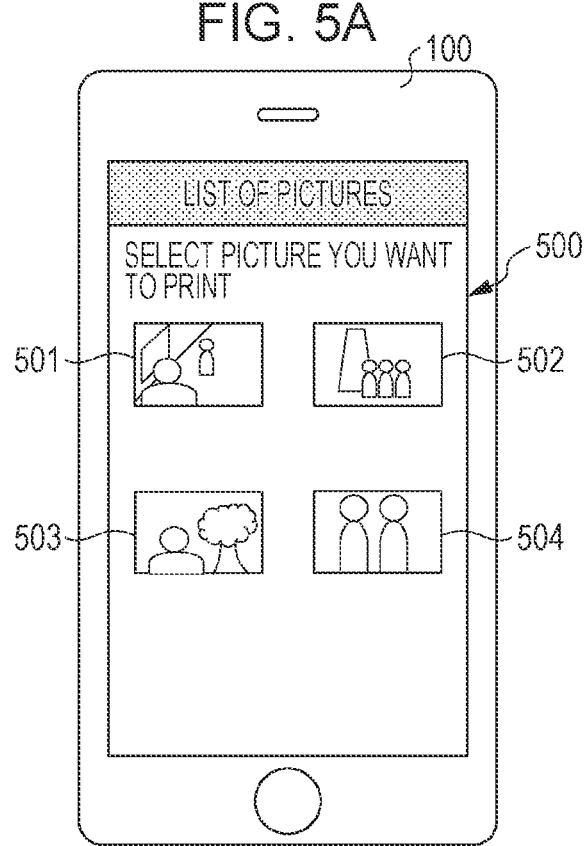
FIGS. 5A to 5D are diagrams illustrating screens provided by a print application 300.
Figure 5B:
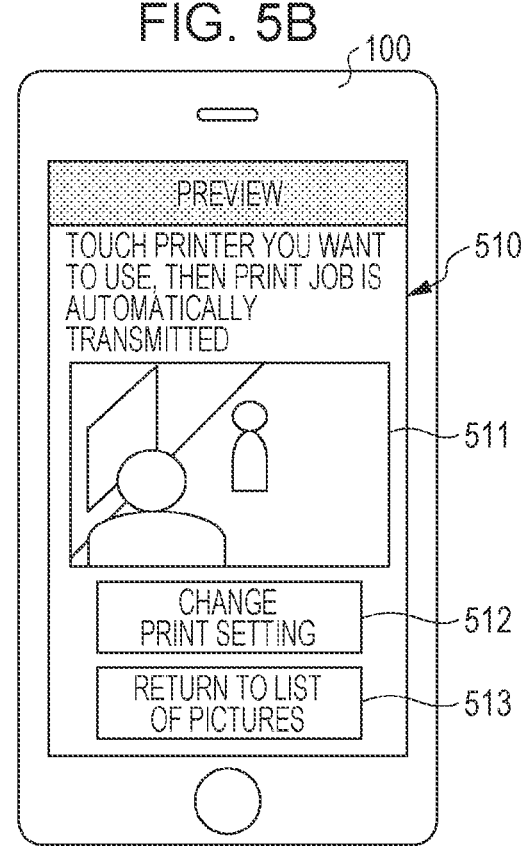

A software configuration of the print application 300 is described in further detail below. A screen control unit 301 controls the screen displayed on the operation panel 206 via the OS 310. For example, a screen such as that described later with reference to FIGS. 5A to 5B is displayed on the operation panel 206 by the screen control unit 301. Furthermore, the screen control unit 301 interprets an operation instruction input by a user via the operation panel 206. A communication unit 302 controls, via the OS 310, short range communication performed by the short range communication unit 210 and wireless communication performed by the wireless communication unit 211.

A Wi-Fi setting changing unit 303 changes, via the OS 310, Wi-Fi setting associated with the wireless communication performed by the portable terminal 100. The OS 310 includes a program that manages the Wi-Fi setting. To this program, the Wi-Fi setting changing unit 303 of the print application 300 may send an instruction to change the Wi-Fi setting. The Wi-Fi setting will be described in further detail later with reference to FIG. 4.

A clock unit 304 measures a time. The measuring the time is performed using an RTC 205 via the OS 310. A print job generation unit 305 generates a print job. The print job generated by the print job generation unit 305 is transmitted by the wireless communication unit 211 to the printing apparatus 110, which executes the print job. A storage unit 306 temporarily stores various kinds of information in a memory such as the RAM 203.

Figure 4A:
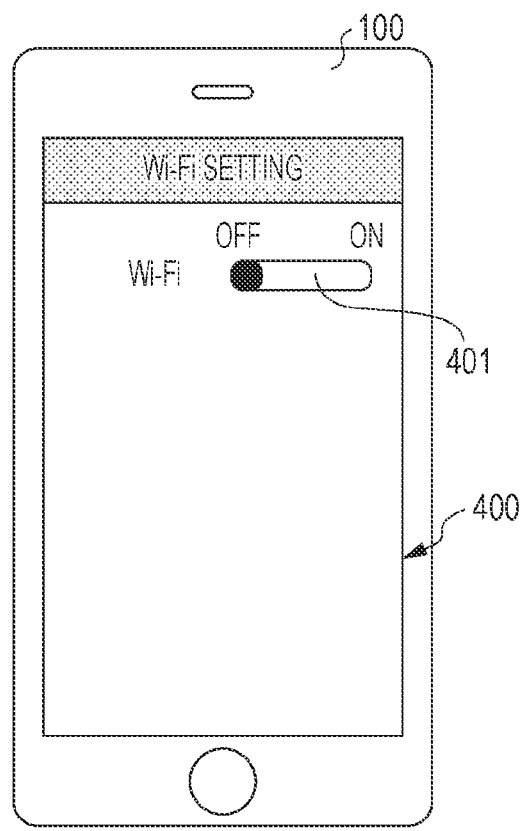
FIGS. 4A and 4B are diagrams illustrating Wi-Fi setting screens.

In FIG. 4A, a setting screen 400 is a screen is provided by the OS 310. This setting screen 400 is displayed on the operation panel 206. The setting screen 400 is for setting whether to enable or disable wireless communication using the wireless communication unit 211.

In a case where "OFF" is selected by pressing a button 401, the Wi-Fi setting associated with the wireless communication is set to an inactive state (an OFF setting) in which the wireless communication is disabled. When the Wi-Fi setting is in the state in which the wireless communication is disabled, the operation of the wireless communication unit 211 is stopped, and thus the power consumption by the portable terminal 100 is reduced. When the wireless communication using the wireless communication unit 211 is not performed, for example, in a situation in which a user goes out, the Wi-Fi setting may be changed into the OFF setting, that is, into the inactive state. FIG. 4A illustrates an example of the setting screen 400 in a state in which the Wi-Fi is set in the OFF setting, that is, the Wi-Fi is set to be disabled.

Figure 4B:
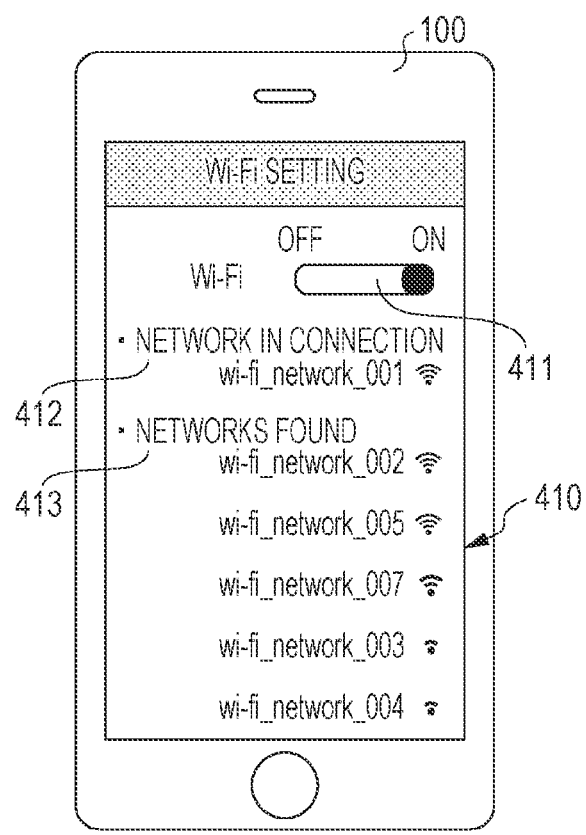

FIG. 4B illustrates an example of the setting screen 410 in a state in which the Wi-Fi is set in the ON setting. When the button 411 is set to "ON", as illustrated in FIG. 4B, the Wi-Fi setting of the wireless communication is set in the active state (ON setting) in which the wireless communication using Wi-Fi is enabled. When the Wi-Fi setting is turned into the ON setting, that is, when the wireless communication using Wi-Fi is enabled, the wireless communication unit 211 starts its operation to seek an access point. If an access point that has been connected in the past is found, the wireless communication unit 211 connects to this access point. Alternatively, the wireless communication unit 211 may connect to an access point specified by a user. Information 412 is displayed to indicate an SSID of the access point with which the wireless communication unit 211 is currently in connection. Information 413 is displayed to indicate SSIDs of access points detected as a result of the seeking.

Note that in FIGS. 4A and 4B, it is assumed by way of example that the Wi-Fi setting is changed manually by a user. In the portable terminal 100 according to the present embodiment, the Wi-Fi setting changing unit 303 is capable of changing the Wi-Fi setting via the OS 310. The changing of the Wi-Fi setting by the Wi-Fi setting changing unit 303 will be described in detail below with reference to flow charts illustrated in FIGS. 6 and 7. Information indicating the setting made via the setting screen illustrated in FIG. 4A or 4B (that is, information indicating whether the wireless communication is enabled or disabled) is stored in the memory such as the HDD 204 or the like.

Next, an outline of a print function realized by the print application 300 and screen transition are described below with reference to FIGS. 5A to 5D. Screens illustrated in FIGS. 5A to 5D are displayed on the operation panel 206 by the screen control unit 301 of the print application 300.

FIG. 5A illustrates a print screen 500 in which a list of pictures stored in the HDD 204 is displayed. In the print screen 500, by way of example, four pictures 501 to 504 are displayed. In this print screen 500, a user is allowed to select a picture that he/she wants to print.

If the user selects a picture in the print screen 500, a print screen 510 illustrated in FIG. 5B is displayed. The print screen 510 illustrated here is, by way of example, in a state in which an picture 501 is selected. 511 denotes the picture selected by a user in the print screen 500. The selected picture is displayed in an enlarged manner so as to make it easier for the user to confirm the selected picture. In a case where the user wants to change the print setting, the user selects an icon 512. In a case where the user wants to get back to the screen (the print screen 500) in which the list of pictures is displayed, the user selects an icon 513.

In this state in which the print screen 510 is displayed, if a user brings the portable terminal 100 to a position close to the NFC tag of the printing apparatus 110, the short range communication unit 210 reads out information stored in the NFC tag of the printing apparatus 110. In the present embodiment, the information stored in the NFC tag of the printing apparatus 110 includes connection information (the SSID of the access point 120, the security key for use in connecting to the access point 120, and the IP address of the printing apparatus 110) for use by the wireless communication unit 211 to perform wireless communication with the printing apparatus 110. Based on the connection information acquired by the short range communication unit 210 by reading the NFC tag of the printing apparatus 110, the wireless communication unit 211 may perform wireless communication with the printing apparatus 110. Note that the connection information may include a MAC address of the printing apparatus 110 instead of the IP address of the printing apparatus 110.

However, in a case where the Wi-Fi setting is performed in the setting screen 400 such that the Wi-Fi is disabled, the wireless communication unit 211 does not perform wireless communication even when the short range communication unit 210 acquires the connection information. Before a user brings the portable terminal 100 to a position close to (or in contact with) the NFC tag of the printing apparatus 110, if the user manually changes the Wi-Fi setting such that the Wi-Fi is enabled, then the handover using NFC is performed and the wireless communication unit 211 is allowed to perform wireless communication. However, to do this, a user needs to perform a troublesome manual operation to change the Wi-Fi setting to the active state. Beside there may be some users who do not have sufficient knowledge about how to operate the portable terminal 100. There may be even users who are not aware of the availability of the function of changing the Wi-Fi setting. In the present embodiment, to handle the above situation, when the portable terminal 100 is brought to a position close to the NFC tag of the printing apparatus 110, in other words, when the short range communication unit 210 acquires connection information from the NFC tag, the Wi-Fi setting is automatically changed from the inactive state to the active state. This makes it unnecessary for a user to manually change the Wi-Fi setting to the active state. Beside even when a user does not have much knowledge about how to operate the portable terminal 100, the Wi-Fi setting is automatically changed to the active state without the user being conscious of the changing.

Figure 5C:
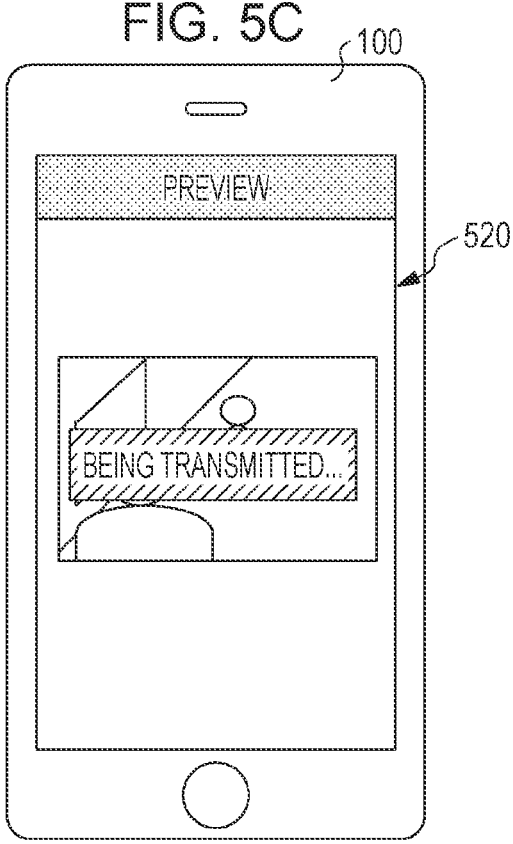
Figure 5D:
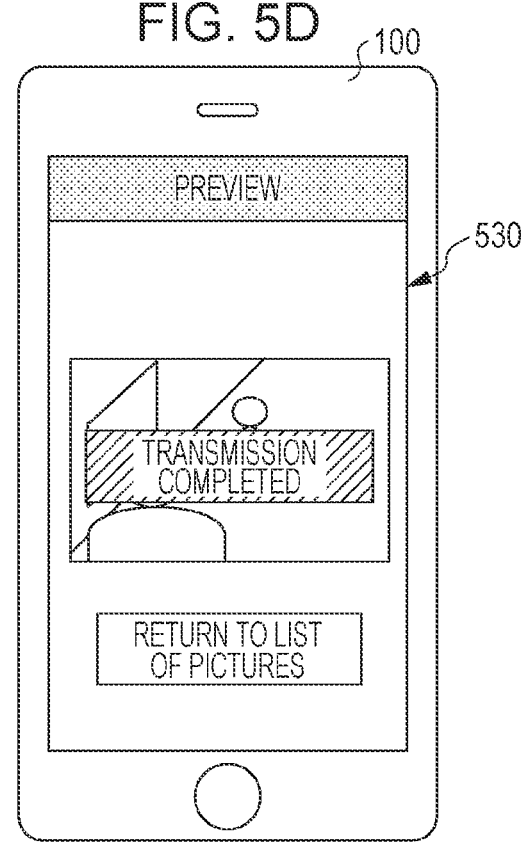

When the short range communication unit 210 acquires the connection information from the NFC tag, the Wi-Fi setting changing unit 303 changes the Wi-Fi setting from the inactive state to the active state. In response, the communication unit 302 instructs the wireless communication unit 211 to connect to the access point 120 based on the acquired connection information. When the wireless communication unit 211 connects to the access point 120, the print job generation unit 305 generates a print job and transmits the generated print job to a destination specified by the IP address included in the acquired connection information, that is, to the printing apparatus 110. At this stage, a print screen 520 illustrated in FIG. 5C is displayed on the operation panel 206 by the screen control unit 301. When the transmission of the print job is completed, a print screen 530 illustrated in FIG. 5D is displayed on the operation panel 206 by the screen control unit 301.

Next, referring to a flow chart illustrating in FIG. 6, a process is described below that is performed when the portable terminal 100 transmits a print job to the printing apparatus 110. Steps in the flow chart illustrated in FIG. 6 are processed by the CPU 201 by loading a control program stored in a memory such as the ROM 202 or the like into the RAM 203 and executing the control program.

In the state in which a user selects a picture that the user wants to print (that is, in the state in which the print screen 510 is displayed), if a user brings the portable terminal 100 to a position close to the NFC tag of the printing apparatus 110, then in step S601 the short range communication unit 210 acquires connection information from the NFC tag using the short range communication. The connection information stored in the NFC tag of the printing apparatus 110 includes information indicating the SSID of the access point 120, information indicating the security key for use in connecting to the access point 120, and information indicating the IP address of the printing apparatus 110.

If the short range communication unit 210 acquires the connection information from the NFC tag, then in step S602 the storage unit 306 initializes a variable WiFi_Flag.

Next, in step S603, the CPU 201 determines whether the Wi-Fi setting is set in the inactive state. This determination is performed by the CPU 201 by referring to the information stored in the memory such as the HDD 204 or the like.

In a case where the CPU 201 determines in step S603 that the Wi-Fi setting is in the inactive state, the processing flow proceeds to step S604. In S604, the Wi-Fi setting changing unit 303 changes the Wi-Fi setting from the inactive state to the active state (from the OFF setting to the ON setting). As a result of the process in step S604, the state changes to a state in which the wireless communication unit 211 is allowed to perform wireless communication. In step S605, the storage unit 306 substitutes 1 into the variable WiFi_Flag. Note that the variable WiFi_Flag is a variable by which to manage the change in the Wi-Fi setting. By substituting 1 into the variable WiFi_Flag in step S605, the print application 300 gets information indicating that the Wi-Fi setting is automatically changed by the Wi-Fi setting changing unit 303.

Because the Wi-Fi setting changing unit 303 automatically changes the Wi-Fi setting from the inactive state to the active state, it becomes unnecessary for a user to perform a troublesome manual operation to change the Wi-Fi setting. Beside even when a user does not have much knowledge about how to operate the portable terminal 100, the Wi-Fi setting is automatically changed to the active state without the user being conscious of the changing.

On the other hand, in a case where the CPU 201 determines in step S603 that the Wi-Fi setting is not in the inactive state, the processing flow proceeds to step S606. In the case where the processing flow proceeds to step S606, the Wi-Fi setting is in the active state, and thus it is not necessary to perform the changing of the Wi-Fi setting as is performed in step S604. However, the access point being in connection is to be switched to the access point 120, and it may be desirable to later return the connection to the original access point that is in connection before the connection is switched to the access point 120. Thus, in step S606, the storage unit 306 stores information indicating the access point being currently in connection. For example, in a case where the wireless communication unit 211 is currently in connection with an access point having a SSID of wi-fi_network_001, this SSID is stored in the storage unit 306 in step S606. Note that there is a possibility that the portable terminal 100 is already connected to the access point 120. In this case, the SSID included in the connection information acquired in step S601 is equal to the SSID of the access point being currently connected with the portable terminal 100. Even in this case, switching of the access point in step S607 occurs.

Next, step S607 is described. In step S607, the wireless communication unit 211 connects to an access point indicated by the connection information acquired in step S601, that is, to the access point 120. More specifically, the communication unit 302 controls the wireless communication unit 211 via the OS 310 such that wireless communication is established using the SSID and the security key included in the acquired connection information.

If the wireless communication unit 211 connects to the access point 120, then in step S608, the wireless communication unit 211 transmits a print job. More specifically, first, the print job generation unit 305 generates a print job for printing the picture selected by the user. The communication unit 302 then controls the wireless communication unit 211 via the OS 310 such that the print job is transmitted to a destination indicated by the IP address included in the acquired connection information, that is, to the printing apparatus 110. When the transmission of the print job is in progress, the print screen 520 illustrated in FIG. 5C is displayed on the operation panel 206 by the screen control unit 301. After the print job is transmitted, a process is performed as will be described in dental later with reference to FIG. 7.

As described above, when the portable terminal 100 is bought to a position close to the NFC tag of the printing apparatus 110, even if the Wi-Fi setting is in the inactive state, the Wi-Fi setting is automatically changed, in the process of step S604, from the inactive state to the active state. Thus, it becomes unnecessary for a user to manually change the Wi-Fi setting. Beside, even when a user does not have much knowledge about how to operate the portable terminal 100, the Wi-Fi setting is automatically changed to the active state without the user being conscious of the changing.

Next, referring to a flow chart illustrated in FIG. 7, a description is given below as to a process of automatically returning the Wi-Fi setting from the active state to the inactive state, and a process of returning the access point in connection to the original access point. Steps in the flow chart illustrated in FIG. 7 are processed by the CPU 201 by loading a control program stored in a memory such as the ROM 202 or the like into the RAM 203 and executing the control program.

Note that the process illustrated in the flow chart of FIG. 7 is performed as a continuation of step S608 illustrated in FIG. 6. The communication unit 302 monitors whether the transmission of the print job performed in step S608 is completed or not. If the communication unit 302 detects that the transmission of the print job is completed, that is, if the transmission of the print job in S608 is completed, then in step S701 the CPU 201 notifies the user that the transmission of the print job is completed. More specifically, the notification is given by the screen control unit 301 of the print application 300 displays a print screen 530 (for notifying that the transmission of the print job is completed) illustrated in FIG. 5D on the operation panel 206.

Next, in step S702, the clock unit 304 of the print application 300 starts a counting operation of a timer. This process is performed by the clock unit 304 by controlling the RTC 205 via the OS 310. The counting operation of the timer is performed to determine whether no user operation is performed in a predetermined time period after the completion of the transmission of the print job. If no user operation is performed in the predetermined time period, the Wi-Fi setting is automatically returned from the active state to the inactive state, and the access point in connection is returned to the original access point.

Next, in step S703, the CPU 201 determines whether a user operation is accepted or not. In a case where the CPU 201 determines that a user operation is accepted, then in step S704, the CPU 201 performs a process according to the user operation. For example, in a case where the user operation instructs that the displayed screen is to be changed, then the screen control unit 301 displays a specified new screen on the operation panel 206. On the other hand, in a case where the user operation instructs that printing is to be performed, the communication unit 302 controls the wireless communication unit 211 to transmit a print job. After the process is performed in step S704 according to the user operation, the clock unit 304 of the print application 300 resets, in step S705, the count of the timer. On the other hand, in a case where no user operation is accepted, the processing flow proceeds to step S706.

In a case where the portable terminal 100 is, for example, a smartphone, a tablet PC, or the like which has a capability of performing multi-task processing, there is a possibility that an application such as the print application 300 is operating in background. That is, there is a possibility that the print application 300 is operating in background and a user is actually operating another application (such as a mail application, a telephone directory application, or the like). In a case where a user operation is accepted when the print application 300 is operating in background, the accepted user operation is not associated with the print application 300, and thus the determination in step S703 is negative as to whether a user operation is accepted, and the resetting of the count is step S705 is not performed.

Next, step S706 is described. In step S706, the CPU 201 determines whether the count of the timer indicates that a predetermined time period has elapsed. In the present embodiment, the timer starts counting when the print job is transmitted (step S702), the count is reset whenever a user performs some operation (step S705). In a case where the predetermined time period (for example, 5 minutes) has elapsed without a user operation being accepted, then the CPU 201 determines, in step S706, that the predetermined time period has elapsed, and thus the processing flow proceeds to step S707. In a case where the predetermined time period has not yet elapsed, the determination by the CPU 201 in step S706 is negative as to whether the predetermined time period has elapsed, and the processing flow returns to step S703. In the present embodiment, it is assumed by way of example that when 5 minutes has elapsed without user operation being performed, it is determined in step S706 that the predetermined time period has elapsed, but the predetermined time period is not limited to 5 minutes, and another value may be given as the predetermined time period or a user may be allowed to set the predetermined time period by inputting a particular value in a not-illustrated setting screen.

Next, step S707 is described. In step S707, the CPU 201 determines whether the Wi-Fi setting is to be returned to the inactive state. This determination is performed by referring to the value of the variable WiFi_Flag stored in the storage unit 306.

In the case where the variable WiFi_Flag has a value of 1, this means that, to perform a handover, the Wi-Fi setting has been automatically changed in step S604 from the inactive state to the active state. Therefore, in step S707, the CPU 201 determines that the Wi-Fi setting is to be returned to the inactive state, and the processing flow proceeds to step S708. In step S708, the Wi-Fi setting changing unit 303 changes the Wi-Fi setting from the active state to the inactive state (from the ON setting to the OFF setting). The reason why the Wi-Fi setting is returned from the active state to the inactive state when no user operation is performed in the predetermined time period is to properly handle a possibility that a user is to successively transmit a plurality of print jobs to the printing apparatus 110. This makes it unnecessary for the user to perform a touching operation repeatedly to transmit the plurality of print jobs because after the handover is performed, the Wi-Fi setting is maintained in the active state and the printing apparatus 110 is maintained as the specified destination to which the print jobs are to be transmitted.

On the other hand, in the case where the variable WiFi_Flag has a value of 0, this means that the Wi-Fi setting is in the active state before handover is performed and is maintained in the active state, and thus it is not necessary to change the Wi-Fi setting to the inactive state. Thus in step S707, the CPU 201 determines that the Wi-Fi setting is not to be returned to the inactive state, and the processing flow proceeds to step S709. In step S709, the communication unit 302 controls the connection of the access point such that the access point is changed to an access point stored in the storage unit 306. In the case where the process in step S709 is performed, the portable terminal 100 is in connection with an original access point before handover is performed, but the access point is changed when the handover is performed. Thus the process in step S709 is performed to return the access point to the original access point from that changed via the handover.

In the present embodiment, as described above, even when the Wi-Fi setting is in the inactive state, the Wi-Fi setting is automatically changed from the inactive state to the active state when handover is performed (when connection information is acquired using NFC). This makes it unnecessary for a user to do a troublesome manual operation to change the Wi-Fi setting to the active state. Beside, even when a user does not have much knowledge about how to operate the portable terminal 100, the Wi-Fi setting is automatically changed to the active state without the user being conscious of the changing.

Furthermore, in the present embodiment, in a case where when handover is performed, the Wi-Fi setting is automatically changed from the inactive state to the active state, if no user operation is accepted within the predetermined time period after a print job is transmitted, the Wi-Fi setting is automatically returned to the inactive state. In the case where the Wi-Fi setting is in the inactive state before handover is performed, this means that a user has set the Wi-Fi setting in the inactive state, for example, to reduce electric power consumption. In the present embodiment, the Wi-Fi setting is automatically returned to the disable state after the print job is transmitted, and thus a reduction in electric power consumption of the portable terminal 100 is achieved.

Furthermore, in the present embodiment, in the case where the portable terminal 100 is already in an access point before handover is performed, if no user operation is performed within the predetermined time period, the connection is returned to the original access point. Thus even in the case where the access point being in connection is temporarily changed to perform printing, the access point in connection is returned to the original one without a user being conscious of the changing.

Second Embodiment

Next, a second embodiment which is a modification of the first embodiment is described below. In the first embodiment, as is described with reference to step S705 in FIG. 7, it is assumed by way of example that the count of the time is reset whenever a user operation is accepted. In contrast, in the second embodiment, the count of the timer is not reset whenever a user operation is accepted, but the count of the time is reset when a next print job is transmitted.

Figure 8:
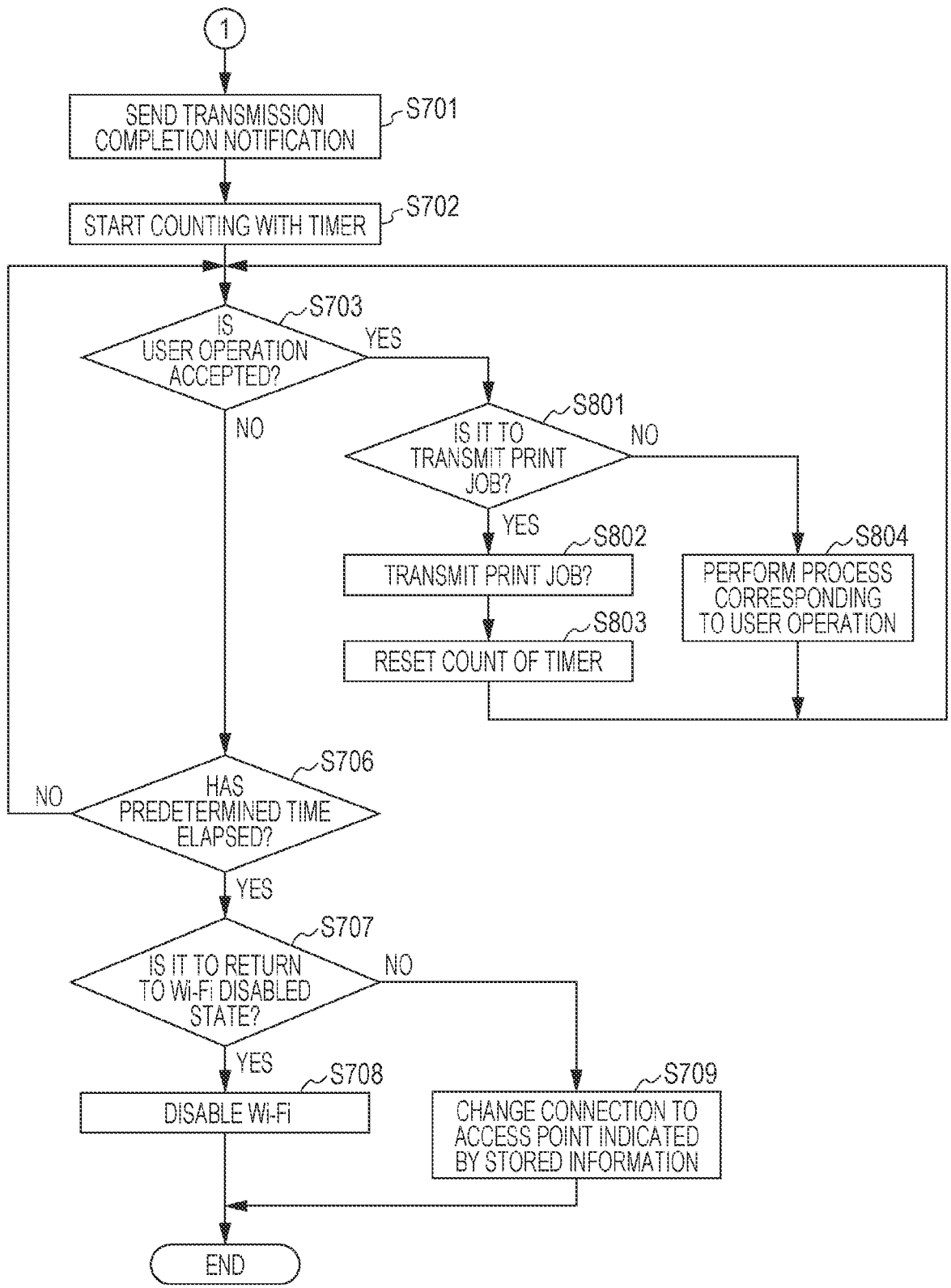
FIG. 8 is a flow chart illustrating a process of automatically returning a Wi-Fi setting to an original state.

FIG. 8 is a flow chart illustrating a process performed as a continuation of step S608 in FIG. 6, and this process is an example of a modification of the process illustrated in the flow chart of FIG. 7. In FIG. 8, steps similar to those in the flow chart illustrated in FIG. 7 are denoted by similar step numbers, and a further description thereof is omitted. The steps in the flow chart illustrated in FIG. 8 are processed by the CPU 201 by loading a control program stored in a memory such as the ROM 202 or the like into the RAM 203 and executing the control program.

In a case where the CPU 201 determines in step S703 that a user operation is accepted, the processing flow proceeds to step S801. In step S801, the CPU 201 determines whether the user operation instructs that a transmission of a print job is to be performed. In a case where the CPU 201 determines that the user operation instructs that a transmission of a print job is to be performed, the processing flow proceeds to step S802. In step S802, the communication unit 302 instructs the wireless communication unit 211 to transmit the print job, and, in response, the wireless communication unit 211 transmits the print job to the printing apparatus 110. Next, in step S803, the clock unit 304 of the print application 300 resets the count of the timer.

On the other hand, in a case where the CPU 201 determines in step S801 that the user operation does not specify a transmission of a print job, the processing flow proceeds to step S804. In step S804, the CPU 201 performs a process according to the user operation. For example, in a case where the user operation instructs that the displayed screen is to be changed, then the screen control unit 301 displays a specified new screen on the operation panel 206. After the process is performed in step S804 according to the user operation, the processing flow returns to step S703 without resetting the count of the timer.

In the present embodiment, as described above, the count of the time is not reset unconditionally when a user operation is accepted, but the count of the time is reset when a command to transmit a print job is issued. In other words, even when a user performs some operation, if this operation is not an instruction to transmit a print job, the counting by the timer is continued. If transmission of a next print job is not performed within the predetermined time period, then step S708 or step S709 is performed.

Third Embodiment

In a certain application like the print application 300, there is a possibility that a user performs an operation to instruct that the application is to be ended. This operation is performed, for example, to reduce the processing load imposed on the CPU 201. A third embodiment described below discloses a process that is performed when the instruction to end an application is issued by a user.

Figure 9:
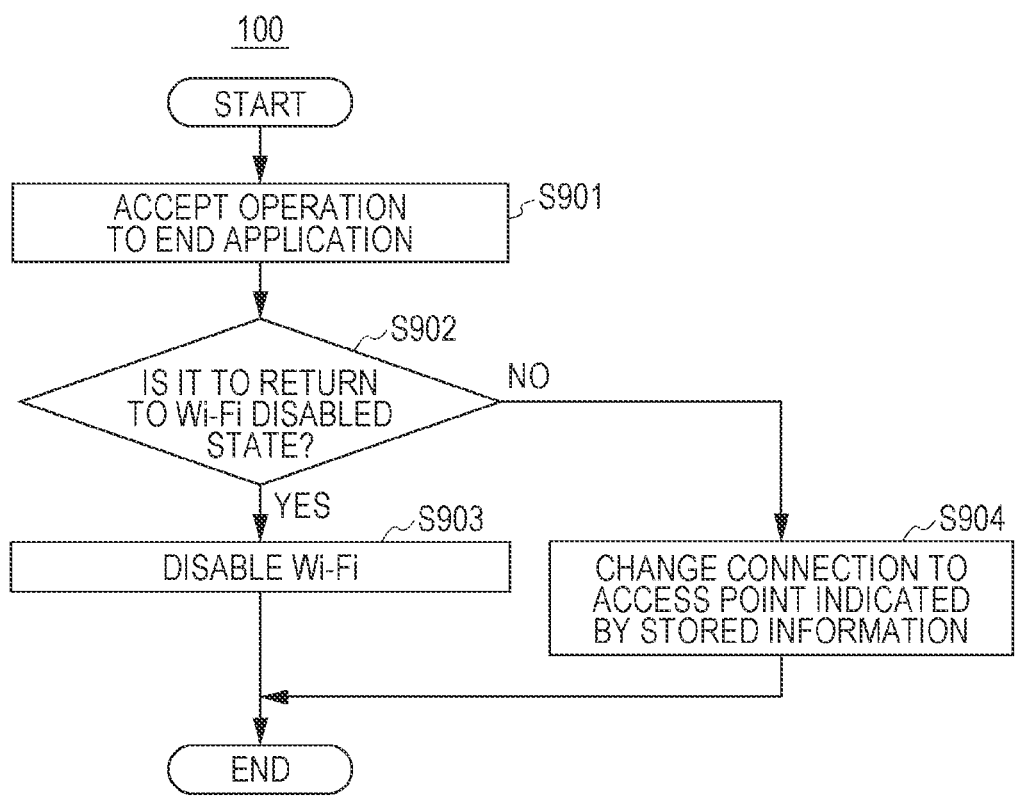
FIG. 9 is a flow chart illustrating a process performed in response to accepting an operation instructing that an application is to be ended.

FIG. 9 is a flow chart illustrating a process that is performed when a user issues an instruction to end the print application 300 being in operation. Steps in the flow chart illustrated in FIG. 9 are processed by the CPU 201 by loading a control program stored in a memory such as the ROM 202 or the like into the RAM 203 and executing the control program.

First, in step S901, the CPU 201 accepts, from a user, an operation of issuing an instruction indicating that the print application 300 is to be ended. Upon receiving this instruction, the CPU 201 determines in step S902 whether the Wi-Fi setting is to be returned to the inactive state or not. This determination is performed by referring to the value of the variable WiFi_Flag stored in the storage unit 306.

In the case where the variable WiFi_Flag has a value of 1, the CPU 201 determines that the Wi-Fi setting is to be returned to the inactive state, and the processing flow proceeds to step S903. In step S903, the Wi-Fi setting changing unit 303 changes the Wi-Fi setting from the active state to the inactive state (from the ON setting to the OFF setting).

On the other hand, in the case where the variable WiFi_Flag has a value of 0, the CPU 201 determines in step S902 that the Wi-Fi setting is not to be returned to the inactive state, and the processing flow proceeds to step S904. In step S904, the communication unit 302 controls the connection of the access point such that the access point is changed to an access point indicated by information stored in the storage unit 306.

In the present embodiment, as described above, in a case where a user issues a command indicating that an application is to be ended, the Wi-Fi setting is returned to the inactive state and/or the access point in connection is returned to an original access point. Even in a case where the Wi-Fi setting or the access point in connection is changed when handover is performed as in the first embodiment, it is possible to return the Wi-Fi setting or the access point in connection to the original state when the application is ended.

Note that the timing of performing the process illustrated in FIG. 9 is not limited to when the operation is performed to end the print application 300. For example, the process may be performed when the print application 300 is switched to a background operation mode.

OTHER EMBODIMENTS

In the embodiments described above, the processes are described by way of example for the case where the portable terminal 100 transmits a print job to the printing apparatus 110, but the data transmission performed between the portable terminal 100 and the printing apparatus 110 is not limited to the print job transmission. For example, the data communication may be performed to transmit a picture, an electronic document, or the like stored in the portable terminal 100 to an external apparatus such as the printing apparatus 110 or the like to store the picture or the electronic document in an HDD of the external apparatus. Alternatively, the data communication may be for the portable terminal 100 to acquire, from the printing apparatus 110, a scan image generated by the printing apparatus 110 by scanning a document. After the data communication is completed, if no user operation is accepted within the predetermined time period, or if no next data communication is performed within the predetermined time period, the Wi-Fi setting or the access point in connection may be returned to the original state.

In the embodiments described above, the processes are described by way of example for the case where the Wi-Fi setting or the access point in connection is returned to the original state when a predetermined period of time has elapsed since the completion of the data communication. However, alternatively, the Wi-Fi setting or the access point in connection may be returned to the original state immediately after the data communication is completed. Alternatively, when the data communication is completed, an inquiry may be sent to a user as to whether the Wi-Fi setting or the access point in connection is to be returned to the original state.

In the embodiments described above, the processes are described by way of example for the case where the Wi-Fi setting or the access point in connection is automatically returned to the original state. Alternatively, in a not-illustrated setting screen, a user may set whether the automatic returning is to be performed or not.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus, a Wi-Fi setting of the information processing apparatus being settable to an ON value or an OFF value based on a user instruction given on a screen provided by an operating system (OS), the information processing apparatus comprising:
    a display configured to display information;
    a wireless local area network (LAN) interface configured to perform Wi-Fi communication with an external device;
    a wireless communicator configured to perform wireless communication with the external device, the wireless communicator being used for communication by a method different from Wi-Fi communication; and
    at least one controller configured to function as:
        a unit configured to receive, on a screen provided by an application program, a user selection of data that is to be transmitted to the external device;
        a unit configured to acquire, via the wireless communicator, connection information including at least a service set identifier (SSID) of an access point, after receiving the user selection of data that is to be transmitted;
        a unit configured to establish a Wi-Fi communication to the connection information, upon reception of the connection information by the wireless communicator;
        a unit configured to perform processing for establishing a connection for Wi-Fi wireless communication based on the acquired connection information;
        a unit configured to perform changing the Wi-Fi setting from the OFF value to the ON value after a wireless communication by the wireless communicator, in a case where the connection information is acquired in a state in which the Wi-Fi setting is in the OFF value after receiving the user selection of data that is to be transmitted, and not to perform automatically changing the Wi-Fi setting from the OFF value to the ON value, in a case where the connection information is acquired in a state in which the Wi-Fi setting is in the ON value after receiving the user selection of data that is to be transmitted;
        a unit configured to, upon establishing the connection for the Wi-Fi wireless communication, transmit the selected data to the external device via the Wi-Fi wireless communication; and
        a unit configured to cancel connection to the access point and connect to an access point different from the access point, at least on condition that the selected data is transmitted, the different access point being an access point connected before the connection information is acquired.

2. A control method for an information processing apparatus, the control method comprising:
    receiving, on a screen provided by an application program, a user selection of data that is to be transmitted to an external device;
    acquiring, via a wireless communicator of the information apparatus, connection information including at least a service set identifier (SSID) of an access point, after receiving the user selection of data that is to be transmitted;

establishing a Wi-Fi communication to the connection information, upon reception of the connection information by the wireless communicator;

performing processing for establishing a connection for Wi-Fi wireless communication based on the acquired connection information;

changing the Wi-Fi setting from the OFF value to the ON value after a wireless communication by the wireless communicator, in a case where the connection information is acquired in a state in which the Wi-Fi setting is in the OFF value after receiving the user selection of data that is to be transmitted, and not to perform automatically changing the Wi-Fi setting from the OFF value to the ON value, in a case where the connection information is acquired in a state in which the Wi-Fi setting is in the ON value after receiving the user selection of data that is to be transmitted;

transmitting, upon establishing the connection for the Wi-Fi wireless communication, the selected data to the external device via the Wi-Fi wireless communication; and canceling connection to the access point and connecting to an access point different from the access point, at least on condition that the selected data is transmitted, the different access point being an access point connected before the connection information is acquired.

3. The method according to claim 2, wherein the wireless communicator is a Near Field Communication (NFC) device.

4. The method according to claim 2, wherein the wireless communicator is a Bluetooth device.

5. The method according to claim 2, wherein the wireless communicator acquires the connection information in a case where the information processing apparatus is brought closer to a predetermined part of the external device.

6. The method according to claim 2, wherein the wireless communicator acquires the connection information in a case where the information processing apparatus touches a predetermined part of the external device.

7. The method according to claim 2, wherein the connection information includes at least an IP address of the external device.

8. The method according to claim 2, wherein the OS and an application are installed in the information processing apparatus, and the application requires the OS to change the Wi-Fi setting to the ON value and requires the OS to change the Wi-Fi setting to the OFF value.

9. The method according to claim 2, further comprising:
changing the Wi-Fi setting of the information processing apparatus to the OFF value in response to a predetermined condition being satisfied after the Wi-Fi communication is established.

10. The method according to claim 9, wherein the predetermined condition is based on at least completion of transmission of predetermined data using the Wi-Fi communication.

11. The method according to claim 10, wherein the external device is a printing device, and the predetermined data is print data to be used for printing by the printing device.

12. The method according to claim 9, wherein the predetermined condition is based on at least receiving an instruction to end an application using the Wi-Fi communication.

13. The method according to claim 9, wherein the predetermined condition is based on at least an elapse of time.

14. The method according to claim 2, wherein the connection information includes address information about the external device.

15. The method according to claim 2, further comprising:
cause the display to display a screen for prompting a user to perform an operation to bring the information processing apparatus and the external device closer to each other.

16. The method according to claim 2, further comprising:
causing the display to display a preview screen of image data to be transmitted to the external device using the Wi-Fi communication.

17. The method according to claim 2, wherein the information processing apparatus is a mobile terminal.

18. The method according to claim 2, wherein the Wi-Fi setting is automatically changed from the OFF value to the ON value, without displaying a confirmation screen on an operation unit of the information processing apparatus, after a wireless communication by the wireless communicator.

19. A non-transitory storage medium storing a program for causing a computer to execute a control process for an information processing apparatus, the control process comprising:

receiving, on a screen provided by an application program, a user selection of data that is to be transmitted to an external device;

acquiring, via a wireless communicator of the information apparatus, connection information including at least a service set identifier (SSID) of an access point, after receiving the user selection of data that is to be transmitted;

establishing a Wi-Fi communication to the connection information, upon reception of the connection information by the wireless communicator;

performing processing for establishing a connection for Wi-Fi wireless communication based on the acquired connection information changing the Wi-Fi setting from the OFF value to the ON value after a wireless communication by the wireless communicator, in a case where the connection information is acquired in a state in which the Wi-Fi setting is in the OFF value after receiving the user selection of data that is to be transmitted, and not to perform automatically changing the Wi-Fi setting from the OFF value to the ON value, in a case where the connection information is acquired in a state in which the Wi-Fi setting is in the ON value after receiving the user selection of data that is to be transmitted;

transmitting, upon establishing the connection for the Wi-Fi wireless communication, the selected data to the external device via the Wi-Fi wireless communication; and canceling connection to the access point and connecting to an access point different from the access point, at least on condition that the selected data is transmitted, the different access point being an access point connected before the connection information is acquired.

* * * * *